May 6, 1924.

J. W. FRENCH 1,493,071

MOUNTING FOR LONG BASE SELF CONTAINED RANGE
FINDERS OR OBSERVATION INSTRUMENTS

Filed Dec. 22, 1921    6 Sheets-Sheet 2

May 6, 1924. 1,493,071
J. W. FRENCH
MOUNTING FOR LONG BASE SELF CONTAINED RANGE
FINDERS OR OBSERVATION INSTRUMENTS
Filed Dec. 22, 1921 6 Sheets-Sheet 3

INVENTOR
James Weir French
By J. Walter Fowler
Attorney

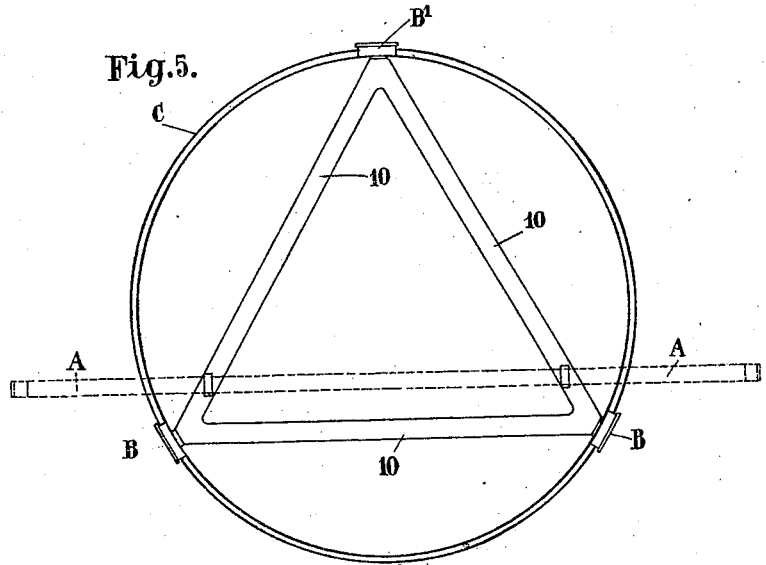
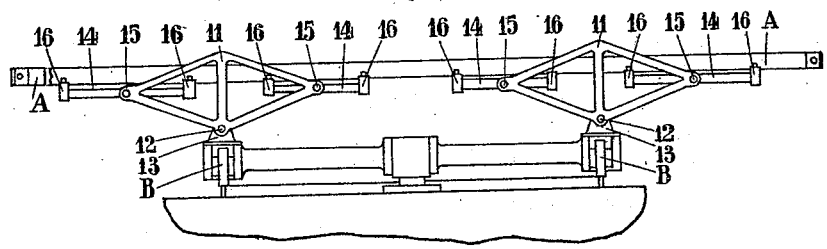
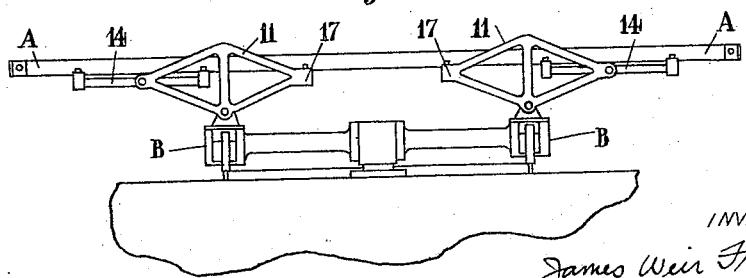

May 6, 1924.   1,493,071
J. W. FRENCH
MOUNTING FOR LONG BASE SELF CONTAINED RANGE
FINDERS OR OBSERVATION INSTRUMENTS.
Filed Dec. 22, 1921    6 Sheets-Sheet 5

INVENTOR
James Weir French
By J. Walter Fowler
Attorney.

May 6, 1924.

J. W. FRENCH 1,493,071

MOUNTING FOR LONG BASE SELF CONTAINED RANGE
FINDERS OR OBSERVATION INSTRUMENTS

Filed Dec. 22, 1921    6 Sheets-Sheet 6

INVENTOR
James Weir French
By J. Walter Fowler
Attorney.

Patented May 6, 1924.

UNITED STATES PATENT OFFICE.

JAMES WEIR FRENCH, OF GLASGOW, SCOTLAND, ASSIGNOR TO BARR AND STROUD, LIMITED, OF GLASGOW, SCOTLAND.

MOUNTING FOR LONG-BASE SELF-CONTAINED RANGE FINDERS OR OBSERVATION INSTRUMENTS.

Application filed December 22, 1921. Serial No. 524,236.

*To all whom it may concern:*

Be it known that I, JAMES WEIR FRENCH, a subject of the King of Great Britain and Ireland, and of Caxton Street, Anniesland, Glasgow, Scotland, have invented new and useful Improvements in or Connected with Mountings for Long-Base Self-Contained Range Finders or Observation Instruments, of which the following is a specification.

This invention refers to mountings for supporting long base self-contained rangefinders or other observation instruments (for example heightfinders) of the type in which the diameter of the instrument is small in comparison with its length, and the principal object of the invention is to provide an improved mounting which will withstand the forces applied for azimuthal training without causing the instrument to be distorted transversely, and, further, in cases where elevation adjustments are required, to make provision whereby the forces which are applied to rotate the instrument about its longitudinal axis are so distributed that they will operate without causing the instrument to be distorted rotationally or appreciably so in a manner which will affect the function of the instrument.

According to this invention, the instrument, hereinafter referred to generally as a rangefinder, is arranged to lie upon two groups of supports, one group being provided on one side of the vertical axis of training and the other group on the opposite side thereof. The load carried by these two groups of supports is sustained by two or more main carriages, connected by a horizontally rigid frame, and arranged to travel on a horizontal circular track concentric with the axis of training, azimuthal training being obtained by moving the carriages upon the track. For elevation adjustments the rangefinder is rotated within its supports about its longitudinal axis, the forces producing rotational motion being applied at a position or positions such that the elevational movement of the two ends of the rangefinder shall be equal within the required limits, notwithstanding a difference in the resistance to rotation in the two groups of supports.

Some examples of construction according to this invention appertaining to the mounting of a rangefinder will now be described with reference to the accompanying drawings, in which:—

Figures 4 and 5 are plans illustrating modified constructions.

Figures 6 and 7 are elevations, with a rangefinder in position, illustrating supports.

Figure 1:
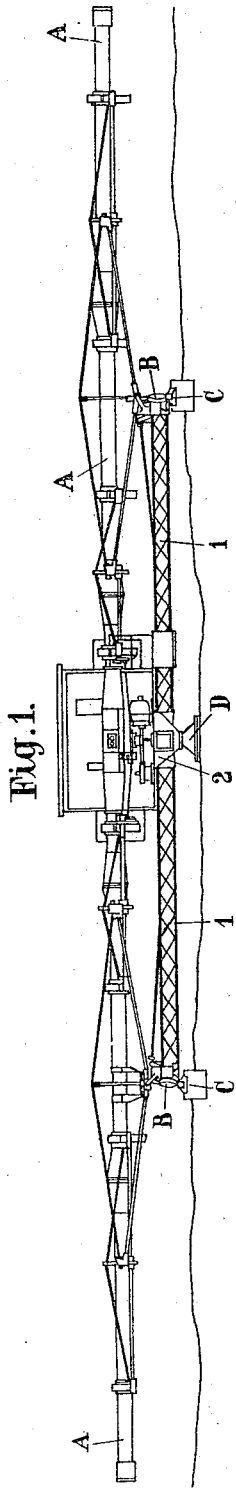
Figure 1 is an elevation of a mounting supporting a rangefinder.
Figure 2:
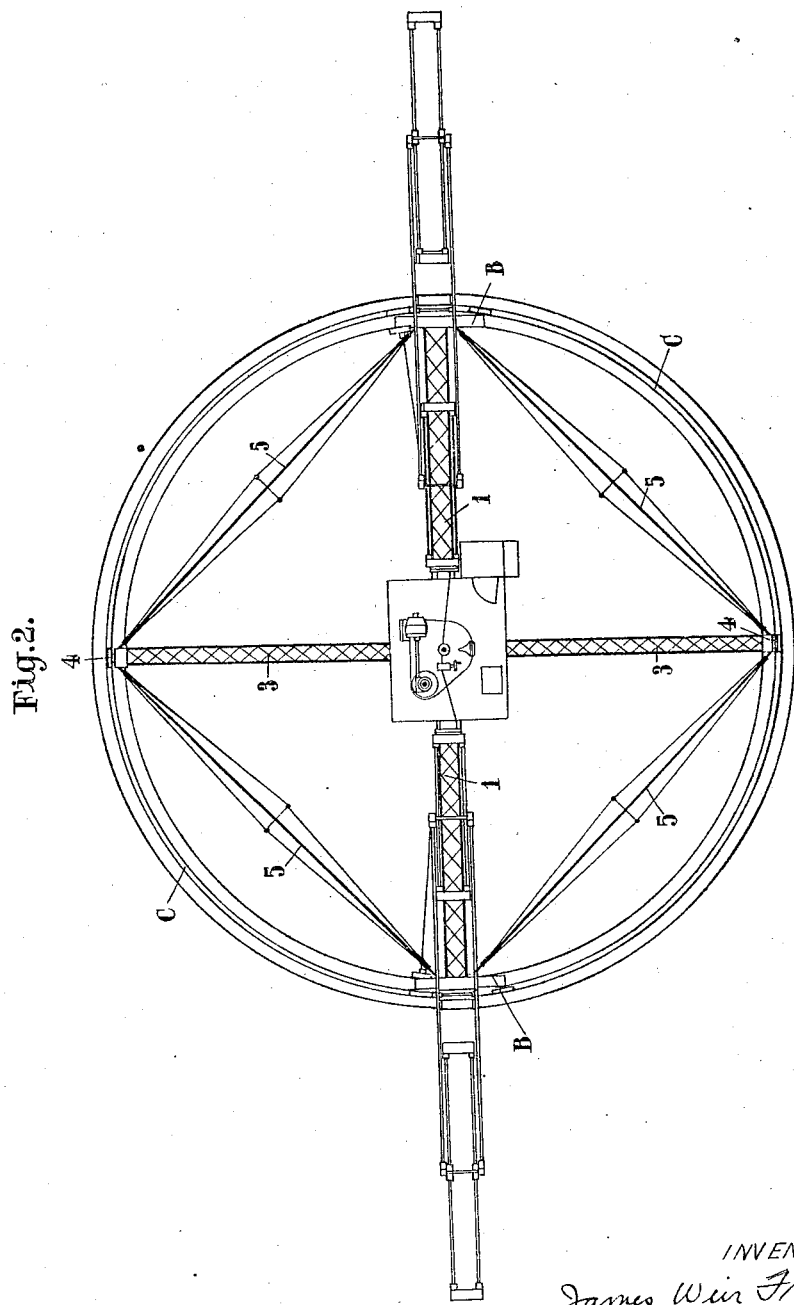
Figure 2 is a plan of the arrangement with the rangefinder omitted.
Figure 3:
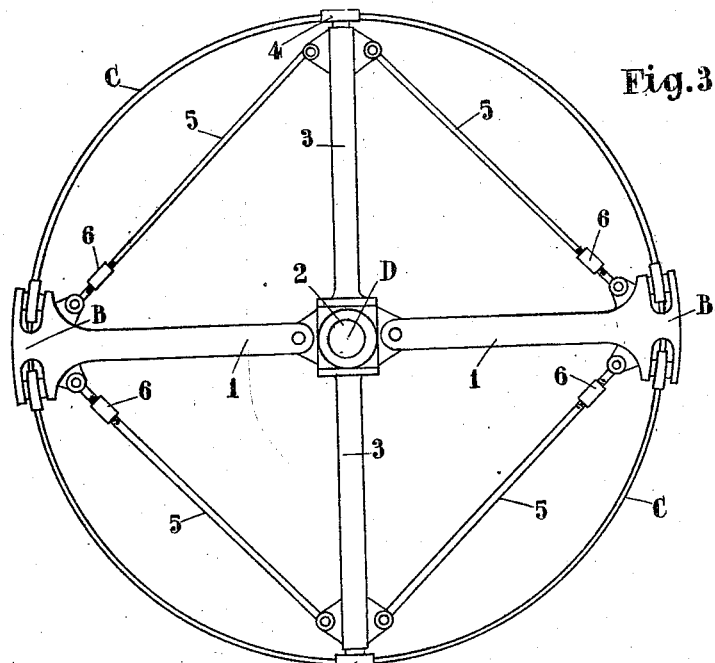
Figure 3 is a plan of a horizontally rigid frame.

In one form the rangefinder mounting may be constructed and arranged as indicated generally in Figures 1 and 2, and the horizontally rigid frame of the mounting as diagrammatically illustrated in Figure 3.

As indicated in Figures 1 and 2, the weight of the rangefinder A and its supports is carried upon two main carriages B, B, which run upon a horizontal circular track C. This track C may be a complete circle or portions of a circle, according to the arc of training desired, and its diameter may be about half the base length of the rangefinder. As diagrammatically illustrated at Figure 3, a central pivot D is provided about which the mounting rotates. Each carriage B is attached rigidly to the outer end of a member 1, of which two are provided. The inner end of each member 1 is pivoted to a sleeve 2 which is mounted to rotate about the pivot D. Two cross members 3, disposed at right angles to the members 1, are rigidly attached at their inner ends to the sleeve 2 and supported each at its outer end upon a wheel 4. The outer ends of the members 1 and 3 are connected by tension members 5 provided with screw couplings 6. By adjusting the couplings 6 the rangefinder supports (to be hereinafter described) associated with the carriages B may be brought into alignment with one another in the horizontal direction. Further, by tension applied to the members 5, the radial members 1 and 3 can be placed under compression, so that the triangles form a frame horizontally rigid capable of resisting deformation in the horizontal plane by the training forces which are to be applied to it.

Figure 4:
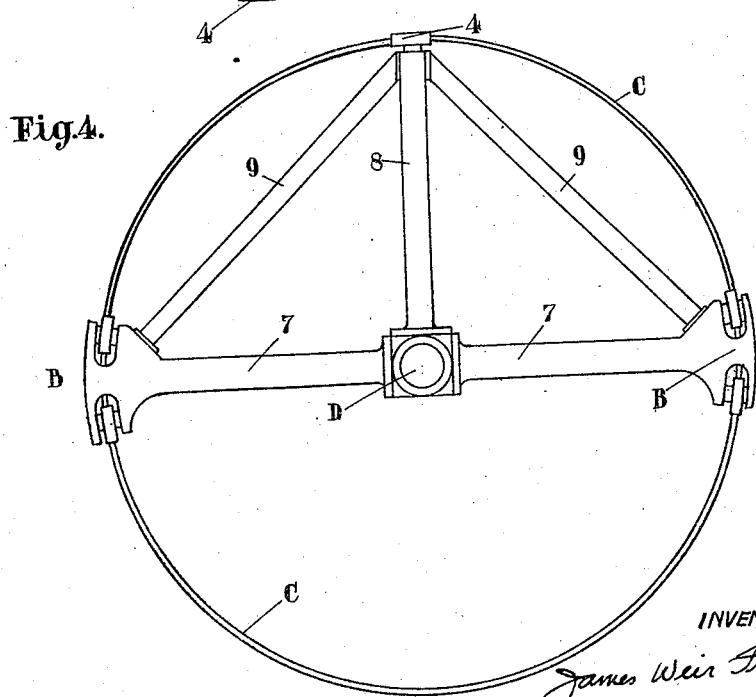

In the modified construction of frame represented in Figure 4, the carriages B are arranged at the ends of a rigid diametral strut 7. To the strut 7 a rigid radial strut 8, at right angles thereto, is attached, and two members 9 capable of withstanding tension or compression, are attached at one end to the strut 7 and at their other ends to the strut 8.

In mountings comprising frames of the character illustrated in Figures 1, 2, 3 and 4 it is intended that the rangefinder A and carriages B shall be arranged diametrically. This however is not essential. For example, the rangefinder may be disposed eccentrically and not directly above the trucks B. As represented in Figure 5, a triangular frame 10 may be used provided with three carriages B, B, B¹, each comprising a single wheel, and the rangefinder A (shown in dotted lines) may be supported in such a position that it lies within the wheel base of the frame. In this case the carriages may be guided radially by the track C or the frame 10 located from a central pivot.

The training forces may be applied to a wheel or wheels of one or more of the carriages B. Other methods of training may be employed. For example, a circular rack (not shown) may be provided concentric to the track C, and the motion communicated to the mounting through the intermediary of gearing to which the training forces are applied.

Means may be provided for preventing the application of excessive force when commencing to train the mounting from a position of rest or when suddenly arresting the movement of the mounting, or for damping oscillations. For example, when the forces are applied to the wheel of a carriage, the drive may be transmitted through a clutch of the friction or other known type.

Upon each of the carriages B in Figure 6, a cantilever 11 is mounted capable of movement in a vertical plane about a horizontal pivot 12, which may be adjustable in azimuth about a vertical axis. For example, each pivot 12 may be supported upon a turntable 13 associated with its supporting carriage B. At the two ends of each cantilever 11 cradles 14 are mounted each on a horizontal pivot 15. Each cradle 14 is provided with end supports 16 for the rangefinder A to rest on and are so disposed that they can move freely about their horizontal pivots 15. In this construction there are two cantilevers and four cradles which provide eight points of support for the rangefinder. The cradles 14 may also be so arranged as to secure self-alignment in a horizontal plane by providing the requisite freedom of movement along the axes 15 or about an axis vertical thereto.

In another arrangement, represented in Figure 7, cradles 14 may be suspended from the ends, say, the outer ends, of the two cantilevers 11, and a single support 17 be provided at the inner end of each of the cantilevers. In this construction there are two cantilevers and two cradles which provide six supports for the rangefinder. In this case the supports 17 may be fixed so far as rotational movement in a horizontal plane or lateral movements are concerned, while the cradles 11 may have the freedoms of movement described with reference to Figure 6.

By a suitable combination of the self-aligning means described, the condition may be satisfied that, while the instrument is supported within its bearings so as to be capable of rotation about its longitudinal axis, two positions on the length of the instrument are fixed relatively to the mounting, while all other parts of the instrument are not prevented by the supports from aligning themselves.

In another arrangement (not illustrated) we may dispense with the cradles and provide at the ends of the cantilevers supports which afford the freedom of movements required, there being in such a case four supports, two of which constrain the rangefinder except as regards rotation about its longitudinal axis.

The arrangement and number of the supports will depend upon the length of the rangefinder in relation to its diameter. Thus, in the case of a rangefinder of comparatively long base having a base length, for example, of 100 ft., the number of supports might be eight. For shorter base lengths the number of supports may be reduced, as indicated in the examples described above. In all cases the separation of the supports may be so adjusted that, although the body of the rangefinder may sag in a vertical direction at different parts throughout its length, the central portion of the rangefinder and the two ends shall lie approximately upon one and the same longitudinal axis. To satisfy this condition the two supports of a cradle may not be at equal distances from their pivot and the two arms of a cantilever may be unequal, since the distribution of the supports is dependent upon the weights, dimensions, and rigidities of the various sections of the rangefinder.

Figure 8:
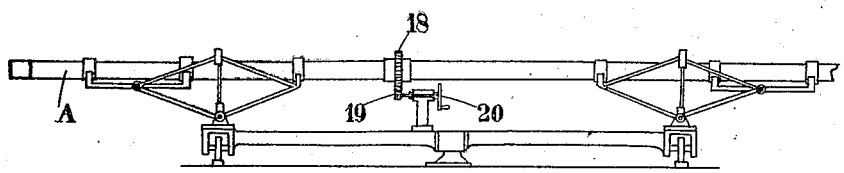
Figures 8, 9 and 10 are elevations, with a rangefinder in position, illustrating gear for elevation adjustments.

For elevation adjustments of the rangefinder, the torque is applied at a position or positions such that the resistances, in so far as they concern relative rotations of the two ends of the rangefinder about a longitudinal axis, are balanced. Thus, for example, in one arrangement, Figure 8, the rangefinder A is provided with a toothed circle or quadrant 18 and a pinion 19 is carried upon the mounting, with a hand-wheel 20 for operating the pinion. This elevating gear is so arranged that it can be adjusted longitudinally with respect to the rangefinder into such a position that, although the lengths of the rangefinder on either side of 18 may be unequal, the twist of the two ends of the rangefinder relative to an intermediate part, say that containing the eyepiece prisms, will be approximately equal.

Figure 9:
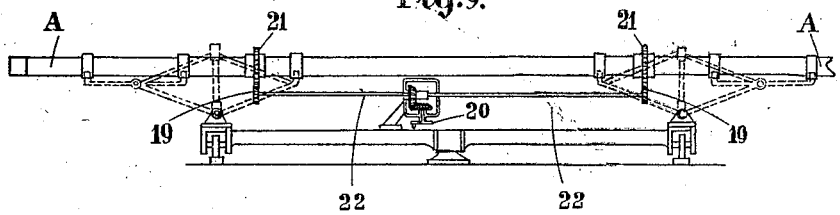

For the principal purposes of reducing the total amount of twist of the ends relatively to the intermediate part of the rangefinder, as illustrated in Figure 9, the elevating forces may be applied at two points by quadrants 21 arranged on opposite sides of the centre of the instrument. In this case pinions 19 are mounted upon a shaft 22 driven from the handwheel 20 by means of bevel or other gearing. In order to make the turning at the two ends of the instrument equal, notwithstanding the resistances at the supports and the torsional flexibility of the rangefinder, the positions of one or both of the quadrants 21 are so adjusted that relative rotational movement of the two ends of the rangefinder A is eliminated. That is to say, if the resistance to the rotation of the portion of the rangefinder A towards the left side of the centre is greater than that of the right hand side, the point of attachment to the rangefinder of the gear 21 at the left hand side would be moved towards the left hand end, the corresponding portion of the shaft 22 being lengthened by an appropriate amount.

Figure 10:
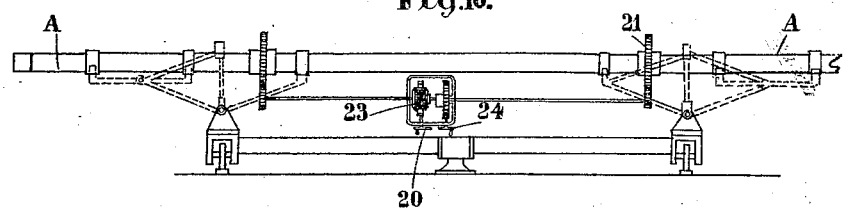

As indicated in the arrangement illustrated at Figure 10, the elevating forces may be applied to the two elevating gears 21 through the intermediary of a differential gear 23, the jockey element of which may be driven by the handwheel 20.

In elevating gear of this type in which the force is applied to more than one point on the rangefinder, as indicated in Figure 10, an auxiliary handle 24 may be provided by means of which the one end of the rangefinder A may be rotated by a small amount relatively to the other end. Thus, the auxiliary handle 24 may operate through the intermediary of a worm and worm wheel, the arrangement being such that the worm may be disconnected when the elevating gear is in use and the differential 23 be clamped when the auxiliary gear is in use.

Figure 11:
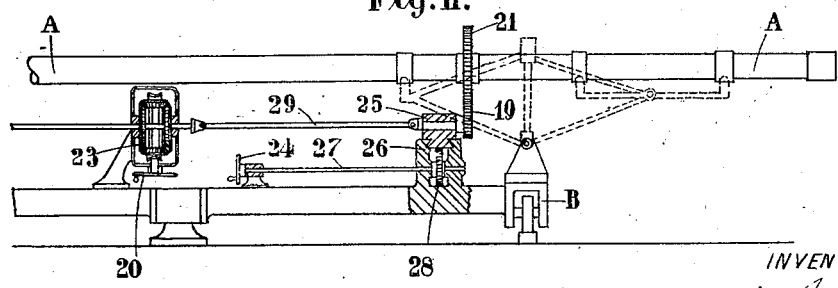
Figure 11 is an elevation illustrating a modification.

Another arrangement of auxiliary adjustment gear is represented in Figure 11. In this case pinion 19 in gear with one of the quadrants 21 is carried by a bearing 25 capable of transverse adjustment within a guide 26, the adjustment being effected by the auxiliary handwheel 24, shaft 27 and pinion 28 which engages with a rack on the bearing 25. The shaft 29 of pinion 19 may be provided with means which will permit the self-adjustment of the length of the shaft 29. The guide 26 and the rack on the bearing 25 may be curved, the centre of the curve being concentric with the axis of the quadrant 21.

Figure 12:
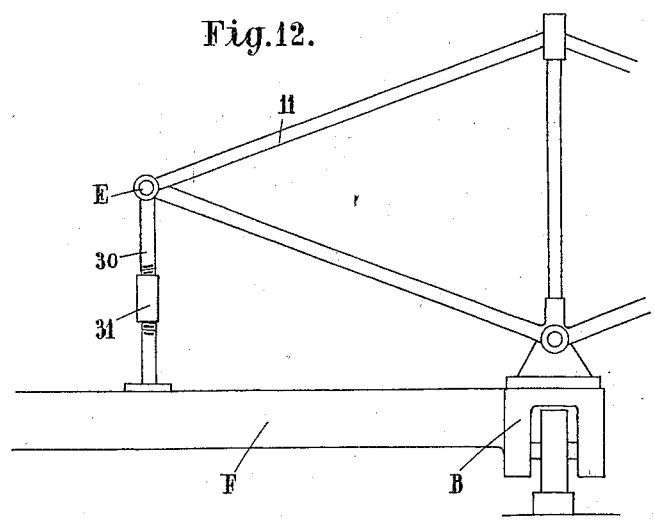
Figures 12 and 13 are elevations illustrating modifications to be described.
Figure 13:
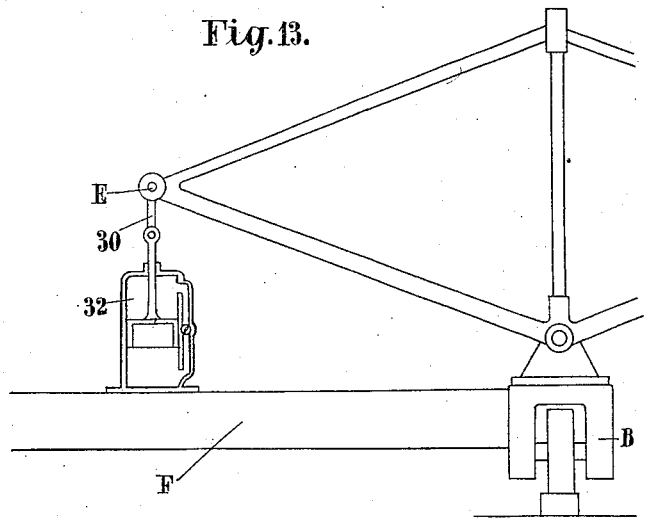

In mountings made in accordance with this invention, the rangefinder A under the action of its weight lies freely within the supports, but the rangefinder may be subjected to other forces in a vertical direction such, for example, as wind forces upon the sunshade frequently fitted to such instruments. In order to prevent oscillations of the rangefinder in a vertical direction, as indicated in Figure 12, the inner ends E, for example, of the cantilevers 11 (one of which only is shown) may be anchored to the frame F. The anchors may be in the form of struts 30 having length adjustments 31 such that the positions which the cantilevers 11 assume, after the rangefinder has taken up its position within the supports, will not be altered, or as indicated at Figure 13 the anchor may comprise a dash pot 32 or equivalent device for damping oscillations.

I claim:—

1. A mounting for instruments of the type defined comprising a horizontal circular track the centre of which constitutes the axis of training, two main carriages located one on each side of the axis of training and arranged to travel on the track, a horizontally rigid frame supported on the carriages and to which the main carriages are connected, two groups of supports for the instrument to lie upon carried by the frame arranged one on each side of the axis of training, and means for applying forces to the frame for azimuthal training, for the purposes set forth.

2. A mounting for instruments of the type defined comprising a horizontal circular track the centre of which constitutes the axis of training, two main carriages located one on each side of the axis of training and arranged to travel on the track, a horizontally rigid frame supported on the carriages and to which the main carriages are connected, two groups of supports for the instrument to lie upon carried by the frame arranged one on each side of the axis of training, means for applying forces to the frame for azimuthal training, and means for effecting elevation adjustments, for the purposes set forth.

3. A mounting for instruments of the type defined comprising a horizontal circular track the centre of which constitutes the axis of training, main carriages arranged to travel on the track, a horizontally rigid frame supported on the carriages and to which the main carriages are connected, the frame having four radial members connected at their outer ends by tension members, two groups of supports for the instrument to lie upon carried by the frame arranged one on each side of the axis of training, and means for applying forces to the frame for azimuthal training, for the purposes set forth.

4. A mounting for instruments of the type defined comprising a horizontal circular track the centre of which constitutes the axis of training, main carriages arranged to travel on the track, a horizontally rigid frame supported on the carriages and to which the main carriages are connected, two groups of supports for the instrument to lie upon carried by the frame arranged one on each side of the axis of training, a cantilever in each group of supports, and means for applying forces to the frame for azimuthal training, for the purposes set forth.

5. A mounting for instruments of the type defined comprising a horizontal circular track the centre of which constitutes the axis of training, main carriages arranged to travel on the track, a horizontally rigid frame supported on the carriages and to which the main carriages are connected, two groups of supports for the instrument to lie upon carried by the frame arranged one on each side of the axis of training, a cantilever in each group of supports, a cradle at one end of each cantilever, and means for applying forces to the frame for azimuthal training, for the purposes set forth.

6. A mounting for instruments of the type defined comprising a horizontal circular track the centre of which constitutes the axis of training, main carriages arranged to travel on the track, a horizontally rigid frame supported on the carriages and to which the main carriages are connected, two groups of supports for the instrument to lie upon carried by the frame arranged one on each side of the axis of training, a cantilever in each group of supports, a cradle at each end of each cantilever, and means for applying forces to the frame for azimuthal training, for the purposes set forth.

7. A mounting for instruments of the type defined comprising a horizontal circular track the center of which constitutes the axis of training, main carriages arranged to travel on the track, a horizontally rigid frame supported on the carriages and to which the main carriages are connected, two groups of supports for the instrument to lie upon carried by the frame arranged one on each side of the axis of training, means for applying forces to the frame for azimuthal training, two toothed quadrants on the instrument located on opposite sides of the axis of training and at a distance therefrom and gear for applying thereto forces for elevation adjustments, for the purposes set forth.

8. A mounting for instruments of the type defined comprising a horizontal circular track the center of which constitutes the axis of training, two main carriages arranged to travel on the track located diametrically one on each side of the axis of training, a horizontally rigid frame supported on the carriages and to which the main carriages are connected, two groups of supports for the instrument to lie upon carried by the frame located diametrical one above each of the carriages, a cantilever in each group of supports each supported on a horizontal pivot, a cradle at each end of each cantilever, each supported on a horizontal pivot, and means for applying forces to the frame for azimuthal training, for the purposes set forth.

JAMES WEIR FRENCH.